(12) United States Patent
Holland (10) Patent No.: US 6,504,604 B1
(45) Date of Patent: Jan. 7, 2003

(54) IN SITU POLARIZATION MODE DISPERSION MEASUREMENT

(75) Inventor: William R. Holland, Warrington, PA (US)

(73) Assignee: Lucent Technologies, Inc., Murray Hill, NJ (US)

(*) Notice: Subject to any disclaimer, the term of this patent is extended or adjusted under 35 U.S.C. 154(b) by 0 days.

(21) Appl. No.: 09/438,855

(22) Filed: Nov. 12, 1999

(51) Int. Cl.[7] ............................................. G01N 21/00
(52) U.S. Cl. ........................................................ 356/73.1
(58) Field of Search ............................... 356/73.1, 364, 356/365, 366, 367; 250/225, 227.17

(56) References Cited

U.S. PATENT DOCUMENTS

| | | | |
|---|---|---|---|
| 5,227,623 A | * | 7/1993 | Heffner ........................ 250/25 |
| 5,298,972 A | | 3/1994 | Heffner |
| 5,371,597 A | | 12/1994 | Favin et al. |
| 5,654,793 A | | 8/1997 | Barlow et al. |
| 5,712,704 A | * | 1/1998 | Martin et al. ................ 356/351 |
| 5,717,489 A | * | 2/1998 | Ozeki et al. ................. 356/364 |
| 5,859,939 A | | 1/1999 | Fee et al. |

* cited by examiner

Primary Examiner—Frank G. Font
Assistant Examiner—Tu T. Nguyen
(74) Attorney, Agent, or Firm—John De La Rosa (57) ABSTRACT

The present invention employs polarizers and delay elements to effect the real-time measurement of optical parameters required to compute the polarization mode dispersion (PMD) in an optical fiber. The measurement is performed in situ and based on the remote sensing of the intensity levels of optical pulses transmitted through two polarizers deployed along the fiber for different known states of polarization at each of two wavelengths. In as much as information about the output states of polarization of the optical pulses contained in these latter intensity transmission measurements are made substantially coincident with the location of the polarizers, the return propagation of the optical pulses does not affect the measured polarization characteristics of the fiber.

23 Claims, 2 Drawing Sheets

IN SITU POLARIZATION MODE DISPERSION MEASUREMENT

TECHNICAL FIELD

The present invention relates to the in situ measurement of polarization mode dispersion (PMD) in optical fibers employed, for example, in communication systems.

BACKGROUND OF THE INVENTION

Recent improvements in fiber materials and transmitters have significantly reduced pulse dispersion, bringing optical fiber communications to a new bandwidth barrier imposed by polarization mode dispersion (PMD). Previously, PMD was insignificant in magnitude relative to other dispersive effects, but now has become a limiting factor for communications networks operating at bit rates of about 10 Gb/s or more. PMD which arises from the fiber's birefringence causes the two orthogonal polarization modes of the optical signal in the fiber to travel at slightly different propagation speeds. The difference in the propagation time between the two polarization modes causes the optical signal to broaden on the order of 10–20 picoseconds (ps) in a 100 Km fiber, limiting the data rate of the network. In as much as PMD can change as a function of time due to changes in environmental conditions, a method is needed for measuring the PMD to ensure the integrity of the optical network.

In the prior art, a so-called "Jones-matrix eigneanalysis" method has been recently proposed for measuring the PMD. See, for example, U.S. Pat. No. 5,227,623 (hereinafter the "'623 patent"), which is incorporated herein by reference. In the disclosed method of the '623 patent, the transmission properties of optical devices, including optical fibers, are measured in the form of a so-called "Jones matrix" by recording the response of the optical device for each of three known states of polarization. In doing so, the Stokes parameters of the beam transmitted through the optical device are first measured by splitting the transmitted beam into four beams, and then by passing three of them through optical anlayzers, such as polarizers. For optical fibers, this method unfortunately would require access to the end of the fiber. Otherwise, reflection measurements ostensibly must be employed which would require, among other things, that the state of polarization of the four beams incident on the optical analyzers remain unchanged by the return propagation. Furthermore, since the transmitted beam is split several times, the associated optical loss could limit the method's useful range of applicability, particularly for long-haul optical communication networks.

Accordingly, a method and system are needed for measuring the PMD of optical fibers. Moreover, such a method should desirably be performed in situ, that is, while there is still live traffic.

SUMMARY OF THE INVENTION

The present invention employs polarizers and delay elements to effect the real-time measurement of optical parameters required to compute the polarization mode dispersion (PMD) . The measurement is performed in situ and based on the remote sensing of the intensity levels of optical pulses transmitted through two polarizers deployed along the fiber for different known states of polarization, at each of two wavelengths. In as much as information about the output states of polarization of the optical pulses contained in these latter transmission measurements are made substantially coincident with the location of the polarizers, the return propagation of the optical pulses does not affect the measured polarization characteristics of the fiber.

In a preferred embodiment, the measurement system comprises a narrowband tunable optical source which launches short duration optical pulse(s) adjusted to have six different known polarization states, at each of the two different wavelengths. The polarization characteristics of the optical fiber are determined by remotely sensing the transmission of the launched optical pulses through the two polarizers. To effect this remote sensing, a small portion of each launched optical pulse is tapped off the optical fiber and split into two "optical sensing pulses." One optical sensing pulse passes along one branch through a linear polarizer, and the other passes through a circular polarizer. These optical sensing pulses are redirected back along the optical fiber, thereby allowing transmission measurements to be performed, with each pulse allocated a unique time slot using fiber-based delay lines.

With the input and output states of polarization of the optical pulses expressed as, the polarization characteristics of the optical fiber are determined in the form of a pair of Mueller matrices for each of the two different wavelengths from the intensity levels of the optical pulses transmitted through the two polarizers. With the Mueller matrices converted to corresponding Jones matrices, a Jones matrix calculus is then performed to determine the PMD.

BRIEF DESCRIPTION OF THE DRAWINGS

The features and advantages of the present invention will become more readily apparent from the following detailed description of the invention in which like elements are labeled similarly and in which.

DETAILED DESCRIPTION

The present invention is based on the inventive use of polarizers and delay elements to effect the real-time measurement of optical parameters required to compute the polarization mode dispersion (PMD) in optical fibers. More specifically, the invention measures in situ the PMD based on the remote sensing of optical pulses transmitted through two polarizers deployed along the fiber for different known states of polarization at each of two wavelengths. In as much as information about the output state of polarization of the transmitted optical pulses is made substantially coincident with the location of the polarizers, the return propagation of the optical pulse(s), herein referred to as "optical sensing pulse(s)," does not affect the measured polarization characteristics of the fiber from which the PMD is indirectly calculated.

In general, with the input and output states of polarization of the optical pulses expressed as Stokes vectors, the polarization characteristics of the optical fiber are determined in the form of a pair of Mueller matrices for two different wavelengths, and then converted to corresponding Jones matrices. Based on a Jones matrix calculus, the PMD of the optical fiber is then computed from the pair of Jones matrices.

Without any loss of generality or applicability for the principles of the invention, the preferred embodiment of the present remote PMD measurement system is described with respect to a DWDM communication system. It should be clearly understood, however, that the present invention is equally applicable to lightwave communication systems employing spare or simple WDM.

Figure 1:
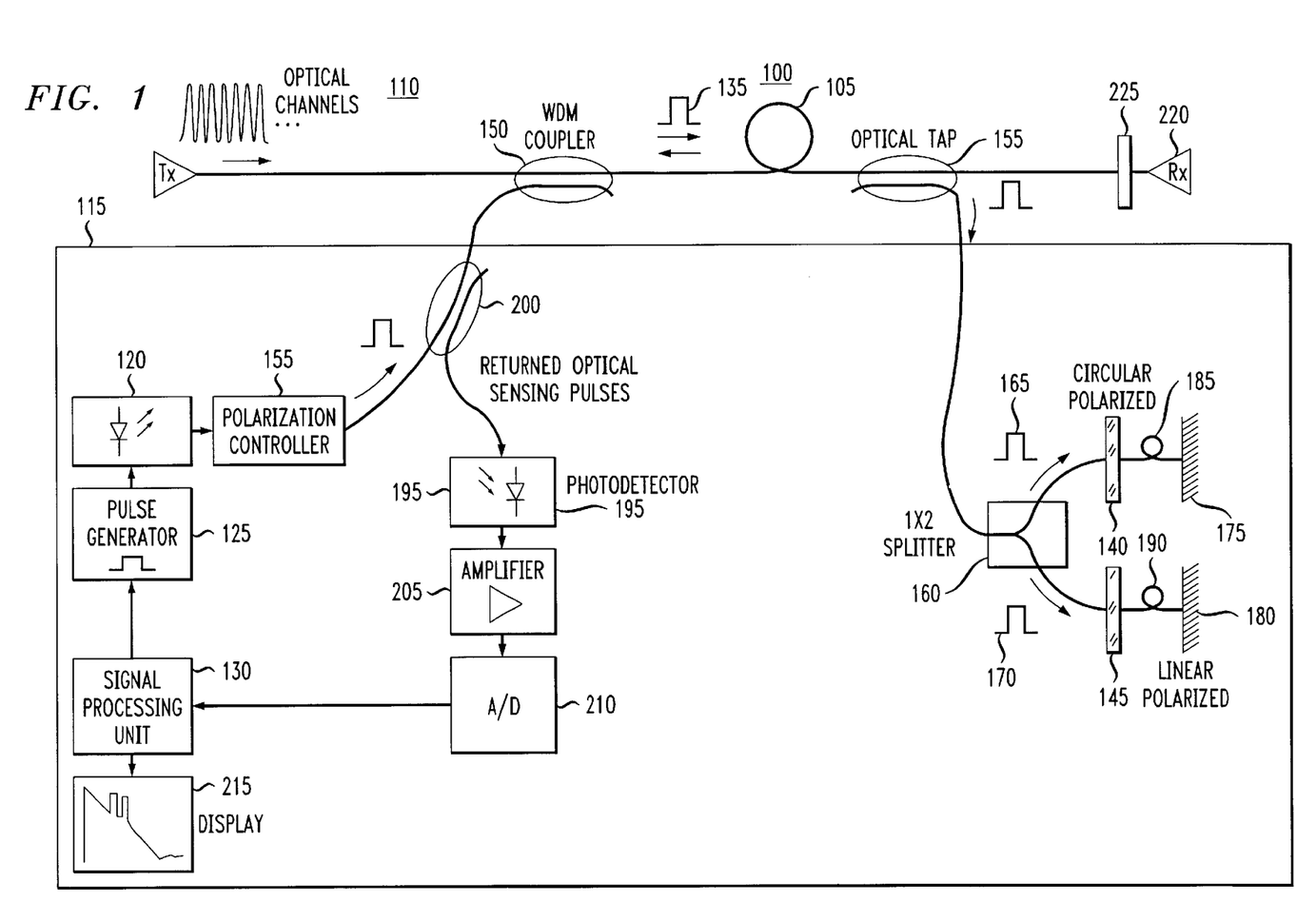
FIG. 1 is a block diagram of an optical system for measuring the PMD in an optical fiber in accordance with the principles of the invention.

Shown in FIG. 1 is an exemplary wavelength division multiplexed (DWDM) communication system 100 in which an optical transmission fiber 105 carries the desired optical signals over a plurality of independent optical channels 110. Each of the optical channels is allocated a unique wavelength band to transmit information over optical fiber 105 using well-known modulation techniques, preferably in the commonly used 1.55 $\mu$m region, where the attenuation is the lowest. In practice, the optical channels are generated by a plurality of transmission lasers and, then multiplexed onto optical fiber 105 using a fiber coupler. Although not shown, WDM communication system 100 preferably also employs Erbium (Er) doped fiber amplifiers to maintain the amplitude and integrity of the optical signals over substantially the entire span of optical fiber 105.

In accordance with the principles of the invention, shown in FIG. 1 is a remote PMD measurement system 115 comprising a narrowband tunable optical source 120 which is intensity modulated by a pulse generator 125 upon being triggered by a signal-processing unit 130, operating in the much the same way as an optical time-domain reflectometer (OTDR). Preferably, optical source 120 is an external cavity diode laser which can be tuned over a narrow spectrum to different wavelengths. Alternatively, optical source 120 can include one or more solid state lasers lasing at different wavelengths. For 1550 nm traffic signal wavelengths, the 1625–1650 nm spectrum may be used for tunable optical source 120 due to the absence of traffic signal wavelengths, among other reasons, advantageously allowing the measurement to be performed in situ with live traffic.

In operation, PMD measurement system 115 launches short duration optical pulse(s) 135 from optical source 120 adjusted to have six different known polarization states, herein denoted by the subscript numeral i=1 through 6, and then measures as a function of time the intensity or power transmitted through polarizers 140, 145 deployed along the span of optical fiber 105. A WDM coupler 150 is preferably used for coupling optical pulse(s) 135 into fiber 105 which also allows the traffic signal wavelengths to simultaneously propagate through the fiber. Importantly, a polarization controller 155 adjusts the polarization state of light pulses 135 to have six known linear polarization states at each of the two wavelengths, but alternatively may be elliptical or circular. Polarization controller 155 may be implemented in the form of discrete rotatable wave plates and polarizers, as well as implemented in the form of coils of single-mode fiber which when rotated produce an asymmetric stress field, changing the polarization state of the incident optical light.

As each light pulse(s) 135 propagates along optical fiber 105, the polarization state of the light pulse(s) rotates about the fiber's principal states of polarization because the two orthogonal polarization modes of the light travel at slightly different propagation speeds due to the fiber's birefringence. This latter rate of rotation is well-known to be a measure of the differential group delay $\Delta\tau$ or PMD.

More particularly, the polarization characteristics of the optical fiber are determined by remotely sensing the transmission of optical pulses through polarizers 140, 145 for the six different known states of polarization at each of the two wavelengths. To effect this remote sensing, a small portion (1–10%) of each launched optical pulse 135 is tapped off optical fiber 105 using an optical tap 155, and fed into a 1×2 optical splitter 160 to produce two so-called "optical sensing pulses" 165, 170. One optical sensing pulse (170) passes along one branch through linear polarizer 145 which defines, among other things, the measurement's frame of reference. The other sensing optical pulse (165) directed along a second branch passes through circular polarizer 140, which typically consists of a 45° linear polarizer and quarter-wave plate. Optical sensing pulses 165, 170 are directed to reflectors 175, 180, respectively, using short lengths of, for example, polarization maintaining fiber 185, 190 assumed to introduce negligible loss and PMD. The optical sensing pulses now reflected back along optical fiber 105 allow intensity transmission measurements to be performed from which the polarization characteristics of optical fiber 105 are determined, including indirectly the PMD. However, because the returned signal is typically weak, the measurement is preferably repeated several times to improve the signal-to-noise ratio.

In as much as information about the output states of polarization of the optical sensing pulses contained in these latter intensity transmission measurements are made substantially coincident with the location of polarizers 140, 145, the return propagation of the sensing pulses does not affect the measured polarization characteristics of the fiber.

Returned sensing pulses 165, 170 are then coupled to a photo-detector 195, such as a p-i-n diode or avalanche photo-diode (APD), through a directional coupler 200 whereby the optical sensing pulses are converted to an electrical signal proportional to the intensity of the transmission through the polarizers. Although directional coupler 200 is preferably a 3-dB fusion type fiber coupler, beam splitters, circulators, prisms or optical switches may also be used to perform the same function. The electrical signal is amplified by an amplifier 205, converted into a digital signal using an analog-to-digital converter (ADC) 210, and then processed by signal processor 130 to compute the transmission characteristics of the optical fiber, as discussed herein below. If desired, the intensity of returned optical sensing pulses 165, 170 may be displayed on a monitor 215.

As optical pulse(s) 135 propagates along optical fiber 105, it encounters scattering sites resulting in a portion of launched optical pulse(s) 135 being reflected back along in the opposite direction caused by Rayleigh scattering. This Rayleigh scattering originates from a length of fiber approximately equal to the width of optical pulse(s) 135. In order to resolve the returned optical sensing pulses, sensing pulses 165, 170 should be spaced apart at least by the duration or the width of launched optical pulse(s) 135, which can be readily effected by judiciously choosing the length of polarization maintaining fibers 185, 190.

That is, each of the returned optical sensing pulses is allocated a unique time slot by employing fiber-based delay lines judiciously disposed between polarizers 140, 145 and reflectors 175, 180, such that the returned optical sensing pulses are correspondingly delayed with respect to one another. In doing so, each sensing pulse can now be readily resolved in time. As noted, polarization maintaining fibers 185, 190 of unequal length are preferably employed. In this latter manner, for each launched optical light pulse, the observed reflection will consist of two optical pulses spaced apart in the time domain, with the intensities of the returned signals representative of the transmission through circular polarizer 140 and linear polarizer 145. Also, inasmuch as there is only a two-way splitting, optical loss is greatly minimized, thereby greatly improving the dynamic range of the measurement.

To prevent optical pulse(s) 135 from saturating photodetector 195, sufficient isolation of course should be provided between laser diode 120 and photo-detector 195. Also to ensure nonintrusive testing, optical pulses 135 are removed from the traffic signals prior to reaching a transmission receiver 220 by inserting a bandpass filter 225 to block, for example, the 1650 nm wavelength of optical pulse(s) 135.

With the input and output states of polarization of the launched and optical sensing pulses, respectively, expressed as Stokes vectors, the polarization characteristics of the fiber are now determined in the form of a pair of Mueller matrices for each of the two wavelengths ($\lambda$, $\lambda+\Delta\lambda$), and then converted to corresponding Jones matrices. The wavelength range over which the measurement is performed, however, is selected according to the expected differential group delay. Based on the Jones calculus discussed herein below, signal processing unit 130 then computes the PMD of the optical fiber.

Each state of polarization of the launched optical pulse(s) 135 can be expressed as a so-called Stokes vector [$S_i$] which is a 4×1 matrix having elements known as Stokes parameters that describe the optical power of the launched pulses in particular reference polarization states as follows:

$$[S_i] = \begin{bmatrix} S_{0i} \\ S_{1i} \\ S_{2i} \\ S_{3i} \end{bmatrix} \quad (1)$$

where i corresponds to the $i^{th}$ input polarization state; $S_{0i}$ is the total power; $S_{1i}$ is the optical power through a linear horizontal polarizer minus the optical power through a linear vertical polarizer; $S_{2i}$ is the optical power through a +45° linear polarizer minus the optical power through a −45° linear polarizer; and $S_{3i}$ is the optical power through a right circular polarizer minus the optical power through a left circular polarizer, each for the corresponding $i^{th}$ input polarization state.

The Stokes vectors are normalized by dividing each element by the corresponding value $S_{0i}$:

$$s_{0i} = \frac{S_{0i}}{S_{0i}}; \quad s_{1i} = \frac{S_{1i}}{S_{0i}}; \quad s_{2i} = \frac{S_{2i}}{S_{0i}}; \quad \text{and} \quad s_{3i} = \frac{S_{3i}}{S_{0i}}.$$

Figure 2:
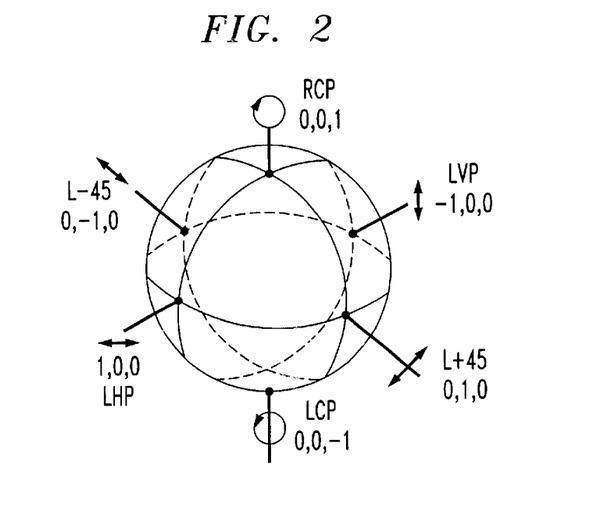
FIG. 2 depicts the Poincare sphere on which are represented various exemplary states of polarization.

Listed below in Table I are the normalized Stokes parameters for several different exemplary polarization states, which as well are graphically depicted in FIG. 2 on a so-called "Poincare sphere," wherein the polarization state is represented as a point having coordinates of its normalized Stokes parameters. Those skilled in the art will readily note that if the output state of polarization is expressed as a vector composed of the normalized Stokes parameters, the rate of rotation of the output state of polarization about the principal state of polarization is a measure of the PMD.

TABLE I

| | |
|---|---|
| 0° polarization state<br>Linear vertical polarization<br>(LVP) | $\begin{bmatrix} 1 \\ -1 \\ 0 \\ 0 \end{bmatrix}$ |

TABLE I-continued

| | |
|---|---|
| 90° polarization state<br>Linear horizontal polarization<br>(LHP) | $\begin{bmatrix} 1 \\ 1 \\ 0 \\ 0 \end{bmatrix}$ |
| 45° polarization state<br>(Linear 45°) | $\begin{bmatrix} 1 \\ 0 \\ 1 \\ 0 \end{bmatrix}$ |
| −45° polarization state<br>(Linear −45°) | $\begin{bmatrix} 1 \\ 0 \\ -1 \\ 0 \end{bmatrix}$ |
| Right circular polarization state<br>(RCP) | $\begin{bmatrix} 1 \\ 0 \\ 0 \\ 1 \end{bmatrix}$ |
| Left circular polarization state<br>(LCP) | $\begin{bmatrix} 1 \\ 0 \\ 0 \\ -1 \end{bmatrix}$ |

In general, the transmission and polarization characteristics of the optical fiber can be represented by 4×4 matrix, with the input and output normalized Stokes vectors related as follows:

$$[s'_i] = [M(\lambda)][s_i] \quad (2)$$

where [$s_i$] and [$s'_i$] are the input and output normalized Stokes vectors, respectively, for the $i^{th}$ polarization state, and [$M(\lambda)$] is the unknown Mueller matrix of the optical fiber given as:

$$[M(\lambda)] = \begin{bmatrix} m_{00} & m_{01} & m_{02} & m_{03} \\ m_{10} & m_{11} & m_{12} & m_{13} \\ m_{20} & m_{21} & m_{22} & m_{23} \\ m_{30} & m_{31} & m_{32} & m_{33} \end{bmatrix} \quad (3)$$

In as much as the Mueller matrix in general is a function of wavelength, it has been denoted herein as [$M(\lambda)$] for emphasis. Note that this wavelength dependence can cause the normalized output Stokes vectors to vary with wavelength, even though the input normalized Stokes vectors remain constant.

Optical fiber 105, however, can be assumed to exhibit negligible polarization dependent loss, and as such, the Mueller matrix [$M(\lambda)$] can be written in terms of a 3×3 sub-matrix [$N(\lambda)$] that describes the rotation of the input Stokes vectors within or on the Poincare sphere as the optical pulses propagate along optical fiber 105:

$$[M(\lambda)] = \begin{bmatrix} 1 & 0 & 0 & 0 \\ 0 & & & \\ 0 & & [N(\lambda)] & \\ 0 & & & \end{bmatrix} \quad (4)$$

where $$[N(\lambda)] = \begin{bmatrix} m_{11} & m_{12} & m_{13} \\ m_{21} & m_{22} & m_{23} \\ m_{31} & m_{32} & m_{33} \end{bmatrix} \quad (5)$$

As will be shown, the unknown Mueller sub-matrix $[N(\lambda)]$ can be determined at each of the two wavelengths by remotely sensing the optical power transmitted through polarizers 140, 145 deployed along the fiber for different known states of polarized light launched into optical fiber 105. It should be recalled that this latter sub-matrix $[N(\lambda)]$ describes the polarization transforming characteristics of the optical fiber. To effect this remote sensing, recall that a small portion of launched optical pulse(s) 135 is split into two optical sensing pulses 165, 170 using 1×2 splitter 160 deployed along the optical fiber. Sensing optical pulse 170 passes through linear polarizer 145 and the other passes through circular polarizer 140, with each corresponding transmitted optical sensing pulse then directed back along optical fiber 105.

It can be shown that the output normalized Stokes vectors $[s'_i]_{lp}$ for the optical pulses propagating along the optical fiber and passing through linear polarizer 145 can be expressed as $$[s'_i]_{lp} = \begin{bmatrix} s'_{0i} \\ s'_{1i} \\ s'_{2i} \\ s'_{3i} \end{bmatrix}_{lp} = [T]_{lp}[M(\lambda)] \begin{bmatrix} s_{0i} \\ s_{1i} \\ s_{2i} \\ s_{3i} \end{bmatrix} \quad (6)$$

where $[T]_{lp}$ is the Mueller matrix for linear polarizer 145, and $s_{0i}$–$s_{3i}$ and $s'_{0i}$–$s'_{3i}$ are the normalized Stokes parameters for the $i^{th}$ input and output polarization states of the launched optical pulse(s) 135, respectively.

In general, the Muller matrix $[T]_{lp}$ of a linear polarizer having its transmission axis rotated about by an arbitrary angle $\theta$ from the horizontal is given by:

$$[T]_{lp} = \frac{1}{2} \begin{bmatrix} 1 & \cos 2\theta & \sin 2\theta & 0 \\ \cos 2\theta & \cos^2 2\theta & \sin 2\theta \cos 2\theta & 0 \\ \sin 2\theta & \sin 2\theta \cos 2\theta & \sin^2 2\theta & 0 \\ 0 & 0 & 0 & 0 \end{bmatrix} \quad (7)$$

An intensity measurement $[I_i]_{lp}$ of the returned optical sensing pulses passing through linear polarizer 145 is given by the first row of the resulting Stokes vector $[s'_i]_{lp}$ and can be expressed as:

$$[I_i]_{lp} = \frac{1}{2}[1 \quad \cos 2\theta \quad \sin 2\theta \quad 0][M]\begin{bmatrix} s_{0i} \\ s_{1i} \\ s_{2i} \\ s_{3i} \end{bmatrix} \quad (8)$$

where $[I_i]_{lp_{ki}}$ is the normalized intensity measurement of the returned optical signal passing through linear polarizer 145 for the $i^{th}$ launched polarization state. Note that the intensity measurements are normalized by the intensity of the light incident on the polarizer using the returned level of Rayleigh backscattering immediately in front of the polarizers so as to normalize the Stokes parameters. Except for the first row of the Mueller matrix $[T]_{lp}$ all other elements have been omitted in as much as they do enter into the matrix calculation for $[I_i]_{lp}$. Performing the above matrix multiplication yields:

$$I_{i_{lp}} = \tfrac{1}{2}[s_{0i} + s_{1i}\cos 2\theta m_{11} + s_{1i}\sin 2\theta m_{21} + s_{2i}\cos 2\theta m_{12} + s_{2i}\sin 2\theta m_{22} + s_{3i}\cos 2\theta m_{13} + s_{3i}\sin 2\theta m_{23}] \quad (9)$$

In general, it can be shown that for n unknown variables, the solution requires a set of n linear equations. Hence, it is apparent that to solve for the above elements of the Mueller sub-matrix $[N(\lambda)]$, requires six equations, each involving a unique state of polarization launched into the optical fiber, i.e., i=1,2,3,4,5,6. The six equations may be condensed and expressed in matrix form where the I and s terms are known and the m variables are to be determined:

$$[A]_{lp}[m'] = [I'_i]_{lp} \quad (10)$$

where $$[A]_{lp} = \begin{bmatrix} s_{11}\cos 2\theta & s_{11}\sin 2\theta & s_{21}\cos 2\theta & s_{21}\sin 2\theta & s_{31}\cos 2\theta & s_{31}\sin 2\theta \\ s_{12}\cos 2\theta & s_{12}\sin 2\theta & s_{22}\cos 2\theta & s_{22}\sin 2\theta & s_{32}\cos 2\theta & s_{32}\sin 2\theta \\ & & \vdots & & & \\ s_{16}\cos 2\theta & s_{16}\sin 2\theta & s_{26}\cos 2\theta & s_{26}\sin 2\theta & s_{36}\cos 2\theta & s_{36}\sin 2\theta \end{bmatrix}$$

$$[m'] = \begin{bmatrix} m_{11} \\ m_{21} \\ m_{12} \\ m_{22} \\ m_{13} \\ m_{23} \end{bmatrix} \quad \text{and} \quad [I'_i]_{lp} = \begin{bmatrix} 2I_{1_{lp}} - s_{01} \\ 2I_{2_{lp}} - s_{02} \\ 2I_{3_{lp}} - s_{03} \\ 2I_{4_{lp}} - s_{04} \\ 2I_{5_{lp}} - s_{05} \\ 2I_{6_{lp}} - s_{06} \end{bmatrix}$$

Pre-multiplying both sides of Eq. (10) by $[A]^{-1}_{lp}$ results in $$[m'] = [A]^{-1}_{lp}[I'_i]_{lp} \quad (11)$$

which provides the general solution for the first two rows of the elements of the Mueller sub-matrix $[N(\lambda)]$. Of course, the above general solution requires that the inverse matrix $[A]^{-1}_{lp}$ be nonsingular, hence requiring, among other things, six unique polarization states to be launched into the optical fiber, i.e., six non-complementary polarization states. Preferably, the six polarization states are as far as possible apart from one another on the Poincare sphere to minimize the effects of noise, for example, oriented at 0, 30, 60, 90, 120 and 150 degrees.

It is apparent, however, that the matrix elements $m_{31}$ $m_{32}$ $m_{33}$ are still required to fully determine the polarization characteristics of optical fiber 105. This can be done by remotely detecting the optical power passing through circular polarizer 140 deployed along another branch of optical fiber 105. In an preferred embodiment, a right circular polarizer is employed, wherein the Mueller matrix $[C]_{rcp}$ is given by $$[C]_{rcp} = \frac{1}{2}\begin{bmatrix} 1 & 0 & 0 & 1 \\ 0 & 0 & 0 & 0 \\ 0 & 0 & 0 & 0 \\ 1 & 0 & 0 & 1 \end{bmatrix} \quad (12)$$

with the output normalized Stokes vectors $[s'_i]_{rcp}$ of the transmitted sensing pulses 165 given by:

$$[s'_i]_{rcp} = \begin{bmatrix} s'_{0i} \\ s'_{1i} \\ s'_{2i} \\ s'_{3i} \end{bmatrix}_{rcp} = \frac{1}{2}\begin{bmatrix} 1 & 0 & 0 & 1 \\ 0 & 0 & 0 & 0 \\ 0 & 0 & 0 & 0 \\ 1 & 0 & 0 & 1 \end{bmatrix}\begin{bmatrix} 1 & 0 & 0 & 0 \\ 0 & m_{11} & m_{12} & m_{13} \\ 0 & m_{21} & m_{22} & m_{23} \\ 0 & m_{31} & m_{32} & m_{33} \end{bmatrix}\begin{bmatrix} s_{0i} \\ s_{1i} \\ s_{2i} \\ s_{3i} \end{bmatrix} \quad (13)$$

Similarly, a normalized intensity measurement $[I_i]_{rcp}$ of the returned optical sensing pulses 165 passing through circular polarizer 140 is given by the first row of the resulting normalized output Stokes vector $[s'_i]_{rcp}$ and given as:

$$[I_i]_{rcp_{1\times i}} = \frac{1}{2}\begin{bmatrix} 1 & m_{31} & m_{32} & m_{33} \end{bmatrix}\begin{bmatrix} s_{0i} \\ s_{1i} \\ s_{2i} \\ s_{3i} \end{bmatrix} \quad (14)$$

To solve for the above elements of the Mueller sub-matrix $[N(\lambda)]$, only requires three equations. Hence, only measurements from three of the six launched states of polarization are required. The three equations may likewise be condensed and expressed in matrix form where the I and s terms are know and the m variable are to be determined:

$$[A]_{rcp}[m''] = [I'_i]_{rcp} \quad (15)$$

where $$[A]_{rcp} = \begin{bmatrix} s_{11} & s_{21} & s_{31} \\ s_{12} & s_{22} & s_{32} \\ s_{13} & s_{23} & s_{33} \end{bmatrix}$$

$$[m''] = \begin{bmatrix} m_{31} \\ m_{32} \\ m_{33} \end{bmatrix} \quad \text{and} \quad [I'_i]_{rcp} = \begin{bmatrix} 2I_{1_{rcp}} - s_{01} \\ 2I_{2_{rcp}} - s_{02} \\ 2I_{3_{rcp}} - s_{03} \end{bmatrix}$$

Pre-multiplying both sides of Eq. (15) by $[A]^{-1}_{rcp}$ results in $$[m''] = [A]^{-1}_{rcp}[I'_i]_{rcp} \quad (16)$$

which provides the general solution for the last row of the elements of the Mueller sub-matrix $[N(\lambda)]$.

To obtain the polarization mode dispersion, a Jones calculus based on the Jones matrix eigenanalysis method of the cited '623 patent is then performed. This determination, however, requires that the measured pair of Mueller matrices at each of the two wavelengths be represented as a corresponding pair of Jones matrices, each which relates the input and output Jones vectors. Those skilled in the art will readily note that the Jones vector is another way to represent the state of polarization of the launched optical pulses, the elements of which specify the magnitude and phase of the x- and y-components of the electric field E of the optical pulses. Written in matrix form, the Jones vector [J] has the form:

$$[J] = \begin{bmatrix} E_{ox}e^{i\phi_x} \\ E_{oy}e^{i\phi_y} \end{bmatrix} = \begin{bmatrix} j_1 \\ j_2 \end{bmatrix} \quad (17)$$

where the real quantities $E_{ox}$, $E_{oy}$ are maximum amplitudes of the x- and y-components of the electric field E, respectively, and $\phi_x$, $\phi_y$ are the corresponding phases.

Accordingly, the output Jones vectors [J'] for an optical pulse propagating along the optical fiber with a Jones matrix [K] can be expressed as:

$$[J'] = [K][J] \quad (18)$$

where [J'] and [J] are the Jones vectors for the input and output polarization states of the optical pulse, respectively, and $$[K] = \begin{bmatrix} k_{11} & k_{12} \\ k_{21} & k_{22} \end{bmatrix} \quad (19)$$

The Jones matrix representation of optical fiber 105, however, can be readily determined by knowing the output Jones vectors in response to three known input polarization states. This matrix calculation is simplest when the input polarization states are linearly polarized light oriented at 0, 45, and 90, degrees for which the input Jones vectors are as follows:

$$J_{0°} = \begin{bmatrix} j_{1\,0°} \\ j_{2\,0°} \end{bmatrix} = \begin{bmatrix} 1 \\ 0 \end{bmatrix} \quad (20)$$

$$J_{45°} = \begin{bmatrix} j_{1\,45°} \\ j_{2\,45°} \end{bmatrix} = \frac{1}{\sqrt{2}}\begin{bmatrix} 1 \\ 0 \end{bmatrix}$$

$$J_{90°} = \begin{bmatrix} j_{1\,90°} \\ j_{2\,90°} \end{bmatrix} = \begin{bmatrix} 0 \\ 1 \end{bmatrix}$$

Although the output Jones vectors $$[J'_{0°}] = \begin{bmatrix} j'_{1\,0°} \\ j'_{2\,0°} \end{bmatrix},$$

$$[J'_{45°}] = \begin{bmatrix} j'_{1\,45°} \\ j'_{2\,45°} \end{bmatrix}, \quad \text{and} \quad [J'_{90°}] = \begin{bmatrix} j'_{1\,90°} \\ j'_{2\,90°} \end{bmatrix}$$

for the above three input Jones vectors cannot be directly calculated, the output Stokes vectors for the input states of polarization of Eq. (20) can be readily determined from Eq. (2) using the Mueller matrix of the optical fiber, which has already been determined from Eqs. (11) and (16). Converting the latter output Stokes vectors to corresponding output Jones vectors, allows the Jones matrices of the optical fiber to be readily calculated, from which the polarization mode dispersion is then calculated.

The output normalized Stokes vector $[s'_{0°}]$ for linearly polarized light oriented at 0 degrees propagating through optical fiber 105 is given by:

$$[s'_{0°}] = [M][s_{0°}] \quad (21)$$

$$[s'_{0°}] = [M] \begin{bmatrix} 1 \\ 1 \\ 0 \\ 0 \end{bmatrix}$$

yielding $$[s'_{0°}] = \begin{bmatrix} 1 \\ m_{11} \\ m_{21} \\ m_{21} \\ m_{31} \end{bmatrix} \quad (22)$$

Similarly, for linearly polarized light oriented at 45 and 90 degrees, the output normalized Stokes vectors are given as follows:

$$[s'_{45°}] = \begin{bmatrix} 1 \\ m_{12} \\ m_{22} \\ m_{32} \end{bmatrix} \quad (23)$$

$$[s'_{90°}] = \begin{bmatrix} 1 \\ m_{11} \\ -m_{21} \\ m_{31} \end{bmatrix}$$

The output Jones vectors $[J'_{0°}]$, $[J'_{45°}]$ and $[J'_{90°}]$ now can be derived from the corresponding output normalized Stokes vectors of Eqs.(22) and (23) in accordance with the following generalized equation:

$$J' = \frac{1}{\sqrt{1+\beta^2}} \begin{bmatrix} 1 \\ \beta e^{j\phi} \end{bmatrix} \quad (24)$$

where $$\beta = \sqrt{\left(\frac{1-s'_1}{1+s'_1}\right)} \text{ and} \quad (25)$$

$$\phi = \begin{cases} \tan^{-1}\frac{s'_3}{s'_2}, & \text{where } s'_2 > 0 \\ \pi + \tan^{-1}\frac{s'_3}{s'_2}, & \text{where } s'_2 < 0 \\ \frac{\pi}{2}, & \text{where } s'_2 = 0 \text{ and } s'_3 \geq 0 \\ -\frac{\pi}{2}, & \text{where } s'_2 = 0 \text{ and } s'_3 < 0 \end{cases} \quad (26)$$

Once the output normalized Stokes vectors have been converted into corresponding output Jones vectors for the input polarization states of 0, 45, and 90 degrees, the Jones matrix [K] for optical fiber 105 can be computed as:

$$K = \begin{bmatrix} k_{11} & k_{12} \\ k_{21} & k_{22} \end{bmatrix} \quad (27)$$

where $k_{11} = p_1 p_4$ $k_{12} = p_2$ $k_{21} = p_4$ $k_{22} = 1 \quad (28)$ with $$p_1 = \frac{j'_{1\,0°}}{j'_{2\,0°}} \quad (29)$$

$$p_2 = \frac{j'_{1\,45°}}{j'_{2\,45°}}$$

$$p_3 = \frac{j'_{1\,90°}}{j'_{2\,90°}}$$

$$p_4 = \frac{p_3 - p_2}{p_1 - p_3}$$

A Jones matrix calculus can now be employed to determine the polarization mode dispersion or the differential group delay $\Delta\tau$. This Jones matrix calculus is based on the Jones matrix eigenanalysis method disclosed in the above cited '623 patent. In large part, the eigenanalysis method is derived on the basis that there exist two input Jones vectors for which the output Jones vectors have no dependence over small range of optical wavelengths, other than its absolute phase which varies with frequency. It has been shown in the '623 that the differential group delay $\Delta\tau$ can be determined from the Jones matrices at each of two wavelengths in accordance with the following equations:

$$\Delta\tau = \left| \frac{\text{Arg}\left(\frac{\rho_1}{\rho_2}\right)}{\Delta\omega} \right| \quad (30)$$

where $\Delta\omega$ is the difference in optical frequency for the corresponding wavelength interval of the measured Mueller matrices, and $\rho_1$, $\rho_2$ are the eigenvalues for the following matrix T involving the Jones matrices K at each of the two wavelengths derived from the corresponding Mueller matrices:

$$T = K(\lambda + \Delta\lambda)K^{-1}(\lambda) \quad (31)$$

where the $\text{Arg}(\alpha e^{i\Theta}) = \theta$.

Figure 3:
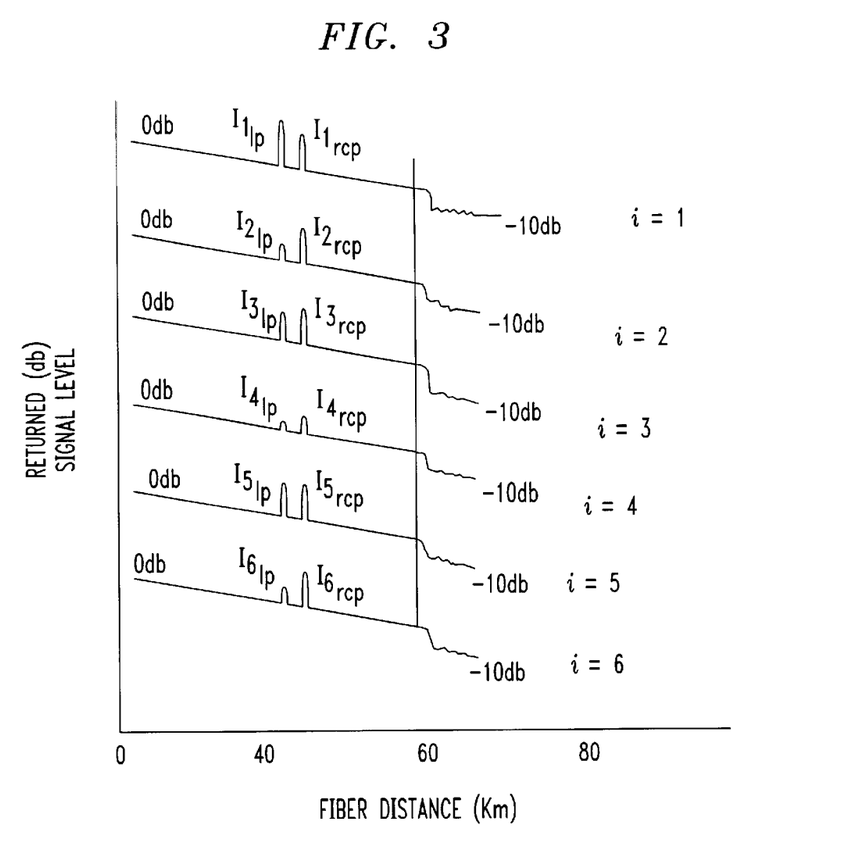
FIG. 3 depicts exemplary traces of the returned optical sensing pulses useful in illustrating the principles of the present invention.

Shown in FIG. 3 are simulated traces 195 of optical sensing pulses 165, 170 returned back along optical fiber 105 for the six different known launched polarization states. The vertical axis represents the relative signal levels of the returned optical sensing pulses on a logarithmic scale (db). The horizontal axis, however, corresponds to the distance between the instrument and a location along the optical fiber, with the time base translated to fiber distance using a conversion factor of about 10 $\mu$s per second. Recall that for each launched optical pulse, the observed reflection consists of two optical pulses spaced apart in time. As such, shown in FIG. 3 are pair groupings of optical pulses $[I_i]_{lp}$, $[I_i]_{rcp}$ representative of the transmission through linear polarizer 145 and circular polarizer 140, respectively, for each of the six known polarization states. Although similar sets of traces are observed at each of the two different wavelengths, only one set has been depicted. As discussed above herein, the desired Mueller matrix elements are isolated using the measured intensity levels, which is performed at each of the two wavelengths ($\lambda$ and $\lambda + \Delta\lambda$). With the pair of Mueller matrices converted to Jones matrices using Eqs. (24)–(29), the differential group delay $\Delta\tau$ is computed from Eqs. (30)–(31).

Note that since the above measurements may be performed in situ, with live traffic, the present invention can be used to determine whether existing optical networks can be upgraded to higher bit rates without compromising the integrity of the network. If the measured polarization mode dispersion exceeds a given threshold level, then it is not possible to upgrade the network. Also, during network installations, baseline PMD measurements can be created and saved in a database. Periodically, the present invention can be employed to measure the PMD which is then compared to its baseline measurement for preventive maintenance.

It should be understood that the embodiments herein above are merely illustrative of the principles of the invention. Various modifications may be made by those skilled in the art which will embody the principles of the invention and fall within the spirit and the scope thereof. For example, although horizontal linear and right circular polarizers have been employed, the above mathematics has been generalized to include polarizers at different orientations.

What is claimed is:

1. An apparatus for measuring polarization mode dispersion in an optical fiber comprising:
   means for launching optical pulses into an optical fiber having known polarization states at each of two wavelengths;
   polarizers deployed along and optically coupled to the optical fiber;
   means for remotely measuring the transmission intensities of the optical pulses through said polarizers, said mean for remotely measuring including an optical tap for tapping a portion of each optical pulse from the optical fiber, an optical splitter coupled to said optical tap for splitting each of said tapped optical pulses into two optical sensing pulses, means for delaying said two optical sensing pulses with respect to each other, and reflectors for reflecting back along the optical fiber the two optical sensing pulses; and
   means for computing polarization mode dispersion based on the measured transmission intensities of the optical pulses for the known polarization states at each of the two wavelengths.

2. The apparatus of claim 1 wherein said means for launching includes an optical coupler for coupling the optical pulses into the optical fiber.

3. The apparatus of claim 1 wherein the polarizers include a linear polarizer and a circular polarizer.

4. The apparatus of claim 1 wherein said means for computing includes a signal processor.

5. The apparatus of claim 1 wherein said means for launching includes an optical source for generating light at each of the two wavelengths, and a pulse generator for modulating the intensity of the light from the optical source to produce the optical pulses.

6. The apparatus of claim 1 wherein said means for launching includes a polarization controller for adjusting the polarization state of the optical pulse.

7. The apparatus of claim 1 wherein said optical pulses has one of six known states of polarization at each of the two wavelengths.

8. The apparatus of claim 1 wherein each of the six known states of polarization is linear polarization.

9. The apparatus of claim 1 wherein said means for delaying includes polarization maintaining fibers of different lengths.

10. The apparatus of claim 1 further including a photodetector for measuring the transmission intensities of the optical pulses.

11. An apparatus for measuring polarization mode dispersion in an optical fiber carrying traffic signals, said apparatus comprising:
   an optical source generating optical pulses having known polarization states at each of two wavelengths;
   an optical coupler coupling the optical pulses into the optical fiber while simultaneously allowing the traffic signals to propagate along the optical fiber;
   means for tapping a portion of each optical pulse from the optical fiber and splitting each optical pulse into first and second optical sensing pulses;
   coupling means for directing said first and second optical sensing pulses through a linear polarizer and a circular polarizer, respectively;
   first and second reflectors coupled to said linear and circular polarizer, respectively, for reflecting back along the optical fiber said first and second optical sensing pulses;
   means for measuring the intensities of said first and second optical sensing pulses reflected back along the optical fiber for the known state of polarization at each of the two wavelengths;
   means for computing polarization mode dispersion based on the measured intensities of said first and second optical sensing pulses reflected back along the optical fiber for the six known polarization states at each of the two wavelengths.

12. The apparatus of claim 11 wherein the linear polarizer is a horizontal linear polarizer and the circular polarizer is a right circular polarizer.

13. The apparatus of claim 11 wherein said means for computing includes a signal processor.

14. The apparatus of claim 11 wherein said optical source includes an optical source for generating light at each of the two wavelengths, a pulse generator for modulating the intensity of the light from the optical source to produce the optical pulses, and a polarization controller for adjusting the polarization state of the optical pulse.

15. The apparatus of claim 11 wherein each of the six known states of polarization is linear polarization.

16. The apparatus of claim 11 further including means for delaying said two optical sensing pulses with respect to each other.

17. The apparatus of claim 16 wherein said means for delaying includes polarization maintaining fibers of different lengths.

18. A method for measuring polarization mode dispersion in an optical fiber comprising the steps of:
   launching optical pulses into an optical fiber having one of six known polarization states at each of two wavelengths, wherein the six known polarization states correspond to unique input Stokes vectors;
   at a distance along the optical fiber, coupling each optical pulse into two branches, thereby splitting the optical pulse into first and second optical sensing pulses;
   transmitting the first optical sensing pulses through a first polarizer, and the second optical sensing pulses through a second polarizer;
   reflecting first and second optical sensing pulses back along the optical fiber;
   measuring the intensities of the first and second optical sensing pulses for the six known states of polarization at each of the two wavelengths;
   calculating the Mueller matrices of the optical fiber at each of the two wavelengths from the input Stokes vectors and the measured intensities of the first and second optical sensing pulses for the six known polarization states;

converting the Mueller matrices into corresponding Jones matrices at each of the two wavelengths; and computing the polarization mode dispersion from the Jones matrices.

19. The method of claim 18 further comprising normalizing the intensities of the first and second optical sensing pulses using the Rayleigh backscattering of the first and second sensing optical pulses.

20. The method of claim 18 further comprising the step of delaying said first and second optical sensing pulses with respect to each other.

21. The method of claim 20 wherein said step of delaying includes the step of introducing polarization maintaining fibers of different lengths between said first and second polarizers, and said first and second reflectors.

22. A method for measuring polarization mode dispersion in an optical fiber comprising the steps of:

launching optical pulses into an optical fiber having a plurality of known polarization states at each of two wavelengths;

tapping off a portion of each optical pulse from the optical fiber and splitting each optical pulse into two optical sensing pulses;

delaying one optical sensing pulse with respect to the other;

measuring the transmission of each optical sensing pulse through polarizers located a distance along the optical fiber from observed reflections of the optical sensing pulses; and computing the polarization mode dispersion in the optical fiber from the measured transmission of each optical pulse through the polarizers.

23. The method of claim 22 further comprising normalizing the intensities of said optical sensing pulses using the Rayleigh backscattering of said optical sensing optical pulses.

* * * * *